Patented Mar. 23, 1943

2,314,699

UNITED STATES PATENT OFFICE 2,314,699

LUMINESCENT MATERIAL

Danforth R. Hale, Madison, N. J., assignor to Radio Corporation of America, a corporation of Delaware No Drawing. Application February 1, 1941, Serial No. 376,997

7 Claims. (Cl. 250—81)

This invention relates to an improved process for making luminescent materials which are particularly efficient in converting impinging radiant energy into luminescent light and, in particular, my process provides a more efficient method of preparing finely divided silicates, germanates, and the like, which are free from inactive surface layers and yet retain the excellent properties of these materials with respect to high resistance to burning under radiant energy bombardment, invariant spectral distribution of emitted light and a wide-band spectral emission characteristic suitable for obtaining material capable of emitting substantially white light. I obtain these beneficial attributes in my process by reversing the order of certain steps of the now known method of making certain classes of luminescent materials which includue an element of the fourth group of the periodic system.

In the prior art the silicates and germanates have been disclosed as being prepared, for example, by precipitating a zinc compound and a suitable activator on silicon dioxide particles, thereafter heat-treating the particles with their precipitated layer and finally grinding the particles to provide the finished luminescent material. The processes are described in detail in a series of United States patents to Leverenz bearing the Numbers 2,210,087 and 2,171,145.

In my invention silica is precipitated on zinc oxide particles or upon zinc oxide plus other metallic oxide particles. The subsequent firing process to initiate and complete the chemical reaction between the oxides is then substantially the same as that used in the prior art.

The advantage of my new process is that finer particle sizes of the finished luminescent material are produced before the milling operation. Not only are the particles finer, but the particles themselves are much more easily fractured and reduced to smaller particles than hitherto provided by known processes of manufacturing. In some cases, the fracturing takes place spontaneously so that it is unnecessary to mill the particle to reduce their size.

Accordingly, one of the purposes of my invention is to provide a more efficient process for producing luminescent materials.

Another object of my invention is to provide a process for manufacturing luminescent materials which will result in finer particles having greater activity than hitherto.

Another object of my invention is to prepare luminescent materials of elements of the fourth group of the periodic system, such as silicates and germanates which will result in easily milled particles, which particles have high resistance to cathode ray bombardment, burning, invariant spectral emission, as well as wide band spectral emission, together with high efficiency in converting the exciting energy into light.

Other objects of my invention will become clear upon reading the following detailed description.

In order to make clear my invention, I will first describe the preparation of a relatively simple luminescent material in accordance with my invention. I will, therefore, describe the process of manufacturing luminescent zinc silicate, as an example. In accordance with my invention, zinc oxide is the starting material and should be in a high state of purity. It is also desirable that the zinc oxide should be in the form of a very finely divided powder. A suitable measure of this oxide is then dispersed in a partially hydrolyzed solution of ethyl silicate. This may be prepared in various ways, for example, by heating the following mixture: 8 volumes ethyl silicate, one volume water, one or two volumes ethyl alcohol or acetone, and a few drops of a mineral acid. The proportions of zinc oxide and silicate may be varied over a wide range, depending upon the final spectral emission characteristic desired, as is obvious from the prior art. By driving off the alcohol and other volatile constituents with heat, the reaction may be brought to completion and the particles of zinc oxide will be coated with silica. The mixture is then dried by strong heating to drive out most of the combined water, pulverized, charged into crucibles, and fired for a length of time and at a temperature determined by the spectral emission characteristic desired, as is known in the prior art.

It is to be observed that this described process deposits a coating of silica around each dispersed zinc oxide particle, in contradistinction to the previously described processes where particles of silica were encased in a layer of zinc carbonate or oxide.

In another method of obtaining a similar product, the finely divided zinc oxide of high purity is dispersed in a dilute solution of a soluble inorganic silicate, for example, sodium silicate, of high purity, and with stirring acetic acid is added in a quantity approximately 10% greater than that required for stoichiometric equivalence. The acid is neutralized preferably by a volatile base, such as ammonium hydroxide, for example, and finally, the solid materials are filtered, washed to remove the alkali, dried, and fired. In this process again the zinc oxide particles are coated with silica.

While I have referred to the use of ethyl silicate and sodium silicate, as sources of silica, it will be appreciated that any soluble silicate capable of yielding silicic acid, by hydrolysis for example, may be employed as well for this purpose.

To prepare manganese activated zinc silicate, the manganese may be added in the small proportions as disclosed in the above cited Leverenz patents by alloying manganese with zinc, oxidizing the alloy, grinding the oxidized zinc and manganese to produce comminuted particles, and thereafter dispersing the finely comminuted oxides in the silicate solution. The remaining steps are then identical with those described above in connection with the preparation of luminescent zinc silicate.

Alternatively, manganese activated zinc silicate may be prepared by dispersing finely comminuted zinc oxide in a silicate solution, precipitating the silica upon the zinc oxide, for example, and filtering out the zinc oxide particles with their precipitated silica coating. The filtered particles may then be suspended in a dilute solution of manganese nitrate. Thereafter, the manganese may be precipitated on the silica layer in the form of carbonate, oxalate, sulfide, oxide, or phosphate. Where the manganese is to be precipitated as carbonate, for example, this may be done by adding sufficient ammonium carbonate, for example, for this purpose, or the solution may be rendered alkaline by adding ammonium hydroxide and then saturating the solution with carbon dioxide. This method of precipitating manganese in the form of carbonates is well known in the art, and for example, is disclosed in the Leverenz Patent No. 2,210,087. The particles, following the precipitation of the manganese upon the silica layer, are then filtered, washed, and heat-treated as described above. Again, the manganese activator may alternatively be added as a solution of a manganese salt to the slurry of silica-coated zinc oxide. The treatment in this case would be to dry the mixture with simultaneous stirring so as to obtain a uniform distribution of the manganese salt over the particles. The salt should be chosen such that on strong heating or firing, it will decompose to give a thin layer of manganese oxide over the particles.

It will be understood, of course, that my method of precipitating the silica upon the metal oxide may be used in the preparation of germanates, in which case a germanate is substituted for the silicate. Moreover, my process is capable of being used where more complex silicates or germanates are used, such as the zinc-zirconium-beryllium types, as described in the Leverenz Patent No. 212,209. Where a more complex positive ion material is desired, the metals may be alloyed or mixed together and then oxidized as described above in connection with the preparation of activated zinc silicate.

Alternatively, as for example, in the preparation of zinc beryllium zirconium silicate activated by manganese, zinc oxide particles may have precipitated thereon silica, as described above, and thereafter, beryllium and zirconium, together with the activating materials such as manganese, are precipitated upon the silica in the form of carbonates, as well known in the art, and the coated comminuted particles subsequently are filtered and fired to provide the finished active luminescent material. Likewise, the secondary electron emission of the finished luminescent material may be effectively increased by additions of small amounts of barium, strontium, calcium caesium, rubidium, lanthanum, cerium, thorium, or their compounds or elements or their compounds which have large ionic or atomic radii.

While I do not wish to be bound by the following theory, it is believed that the improved qualities above defined resulting from luminescent materials prepared by my process are obtained because of the interchanging of positions of the zinc oxide and silica so that the zinc oxide which is more active than the silica is used more efficiently during the heating cycle, the zinc oxide tending to work out into the silica shell. The volume of the shell thus tends to increase at the expense of the zinc oxide core, and since the resultant structural form of the particles is that of a hollow sphere, following the heating process, fracturing of the shell is much easier to achieve and the shell may be crushed very easily and quickly. In fact, in many cases, the minute hollow spherical particles fracture of their own accord into very small particles. In the older process of fabricating luminescent materials, as disclosed in the Leverenz patents, the zinc worked inwardly and reacted with the silica particles with a resultant decreasing volume to form substantially spherical particles which are more difficult to comminute.

Moreover, the decreasing volume reduces the rate of reaction so that longer processing time was necessary.

It will thus be appreciated that my new process retains all the beneficial properties of silicates and germanates prepared in the older fashion, but has an advantage of providing finer particles more readily and simply. Moreover, since the hollow spherical particles may be comminuted with less pressure, the straining of the surface layer is substantially avoided so that the luminescent material has better conversion efficiency and does not require any further treatment.

Having described my invention, what I claim is:

1. The steps in the method of preparing a luminescent material which comprises dispersing an oxide of an element chosen from the group consisting of beryllium, magnesium, zinc and zirconium in a solution of a salt of an element chosen from the group consisting of silicon, germanium, titanium, zirconium, hafnium and thorium, and precipitating the dioxide of the element of the second named group upon the oxide of the element of the first named group.

2. The steps in the method of preparing a luminescent material which comprises dispersing manganese oxide and an oxide of an element chosen from the group consisting of beryllium, magnesium, zinc and zirconium in a solution of a salt of an element chosen from the group consisting of silicon, germanium, zirconium, hafnium, and thorium, precipitating the dioxide of the element of the second named group upon the manganese oxide, filtering the mixture and the oxide of the element of the first named group, washing the filtrate, and subsequently heating the filtrate at a predetermined temperature for a predetermined time.

3. The steps in the method of preparing a luminescent material which comprises dispersing an oxide of a metal chosen from the group consisting of beryllium, magnesium, zinc and zirconium in a solution of a salt of an element chosen from the group consisting of silicon, germanium, titanium, zirconium, hafnium, and thorium, precipitating the dioxide of the said element upon the metallic oxide, filtering the mixture, washing the filtrate, and subsequently heating the filtrate at a predetermined temperature for a predetermined time.

4. The steps in the method of preparing a luminescent material which comprises dispersing the oxide of metals chosen from the group consisting of beryllium, magnesium, zinc, zirconium, and manganese in a solution of a salt of an element chosen from the group consisting of silicon, germanium, titanium, zirconium, hafnium, and thorium, precipitating the dioxide of the said element upon the metallic oxides, filtering the mixture, washing the filtrate, and subsequently heating the filtrate at a predetermined temperature for a predetermined time.

5. The steps in the method of preparing a luminescent material which comprises dispersing comminuted zinc oxide in a partially hydrolyzed solution of a salt of an element chosen from the group consisting of silicon, germanium, titanium, zirconium, hafnium, and thorium, precipitating the oxide of the element upon the zinc oxide by heating, drying the precipitate, and firing the dried precipitate for a predetermined time at a predetermined temperature.

6. The steps in the method of preparing a luminescent material which comprises dispersing comminuted zinc oxide in a partially hydrolyzed solution of ethyl silicate, precipitating silicon dioxide by heating, drying the precipitate, and firing the dried precipitate for a predetermined time at a predetermined temperature.

7. The method of preparing a luminescent material which comprises the steps of dispersing an oxide of an element chosen from the group consisting of beryllium, magnesium, zinc and zirconium in a solution of a salt of an element chosen from the group consisting of silicon, germanium, titanium, zirconium, hafnium, and thorium, precipitating the dioxide of said element upon the metallic oxide, filtering the resultant product, precipitating a compound of manganese on the filtrate, washing the product resulting from the precipitation of the manganese compound, and thereafter firing the last named product at a temperature and for a time interval sufficient to render it luminescent under excitation of radiant energy.

DANFORTH R. HALE.